Sept. 7, 1948.  L. PARASKEVAS  2,448,730
SKIDLESS STEEL GRIP FOR AUTO. TIRES
Filed Oct. 29, 1947  2 Sheets-Sheet 1

Louis Paraskevas
INVENTOR.

Sept. 7, 1948.    L. PARASKEVAS    2,448,730
SKIDLESS STEEL GRIP FOR AUTO TIRES
Filed Oct. 29, 1947    2 Sheets-Sheet 2
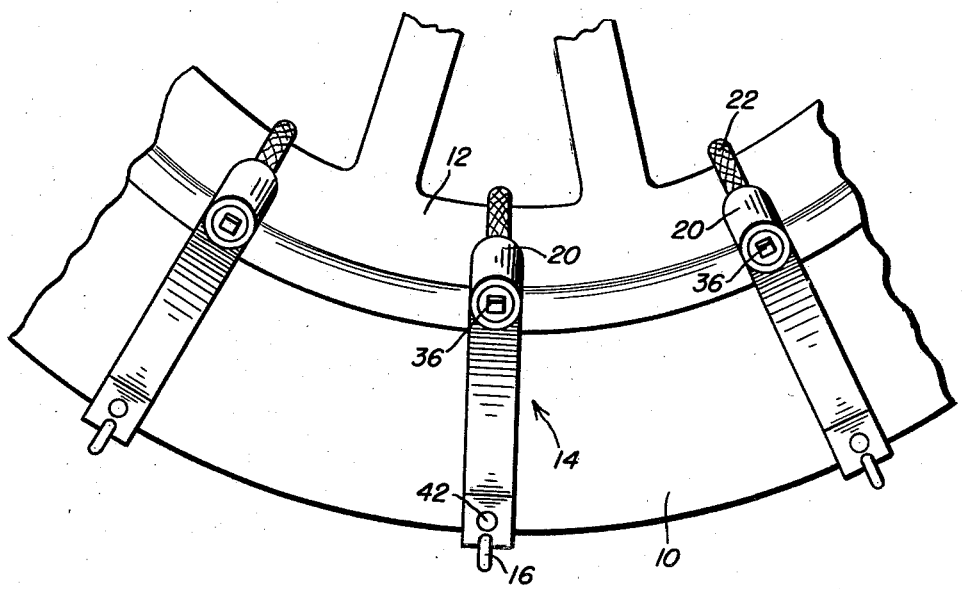
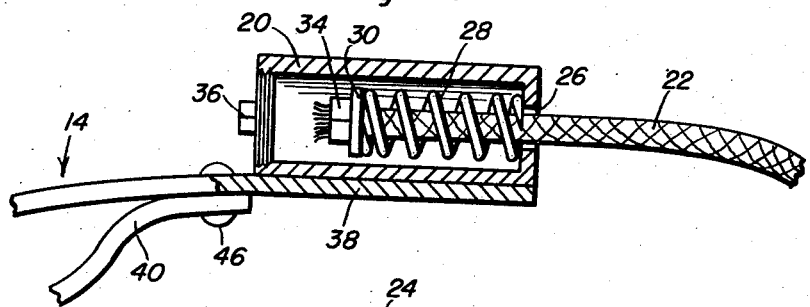
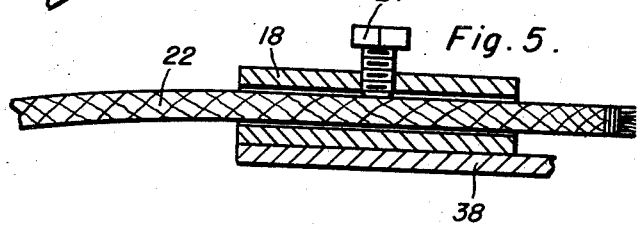
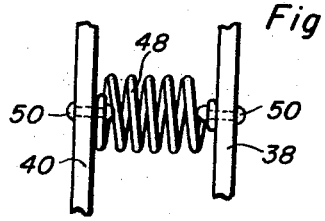
Louis Paraskevas
INVENTOR.

Patented Sept. 7, 1948

2,448,730

UNITED STATES PATENT OFFICE 2,448,730

SKIDLESS STEEL GRIP FOR AUTO TIRES

Louis Paraskevas, Washington, D. C.

Application October 29, 1947, Serial No. 782,726

7 Claims. (Cl. 152—237)

This invention comprises novel and useful improvements in a skidless steel grip for auto tires and more specifically pertains to an emergency chain adapted for ready application to or removal from a tire for increasing the tractive effect thereof.

It is a primary object of this invention to provide an improved emergency tire chain for increasing the tractive effect of tires which may be readily but securely attached to a tire and which has a frictional and resilient embracing grip upon the sides of the walls thereof.

An important feature of the invention resides in the provision of an emergency tire chain having a relatively rigid outer wall and a relatively flexible and resilient inner wall secured thereto, which inner wall shall yieldingly embrace the side walls of a tire, for rigidly attaching the emergency unit to a tire.

A further feature of the invention resides in the provision of additional resilient means secured between the outer and inner members of the emergency chain for increasing the spring pressure upon the side walls of a tire.

Yet another feature of the invention resides in the provision of an emergency tire chain wherein the side walls of the emergency chain are pivotally mounted to the tread portions thereof, and wherein the upper ends of the side wall sections of the tire chain unit are provided with cylinders for detachably and resiliently receiving a connecting cable therebetween.

A still further feature of the invention consists in the provision of a tire chain having integral inner and outer members constituting a flexible gripping member for engaging the side walls of a tire, and wherein the non-skid tread portion of the device is integrally formed with the side members.

These, together with various ancillary objects of the invention which will later become apparent as the following description proceeds, are attained by this device, preferred embodiments of which have been illustrated by way of example only in the accompanying drawings, wherein:

Figure 3 is a fragmentary side elevational view of a rim and tire showing the embodiment of Figure 1 applied thereto;

Figure 4 is a fragmentary enlarged vertical longitudinal sectional view through a portion of the emergency tire chain showing one of the cable fastening means therefor;

Figure 5 is a view similar to Figure 4 but showing the other of the cable fastening means; and, Figure 6 is a fragmentary detail view upon an enlarged scale showing the manner of attaching one of the resilient means between the inner and outer members of the emergency tire chain.

Figure 1:
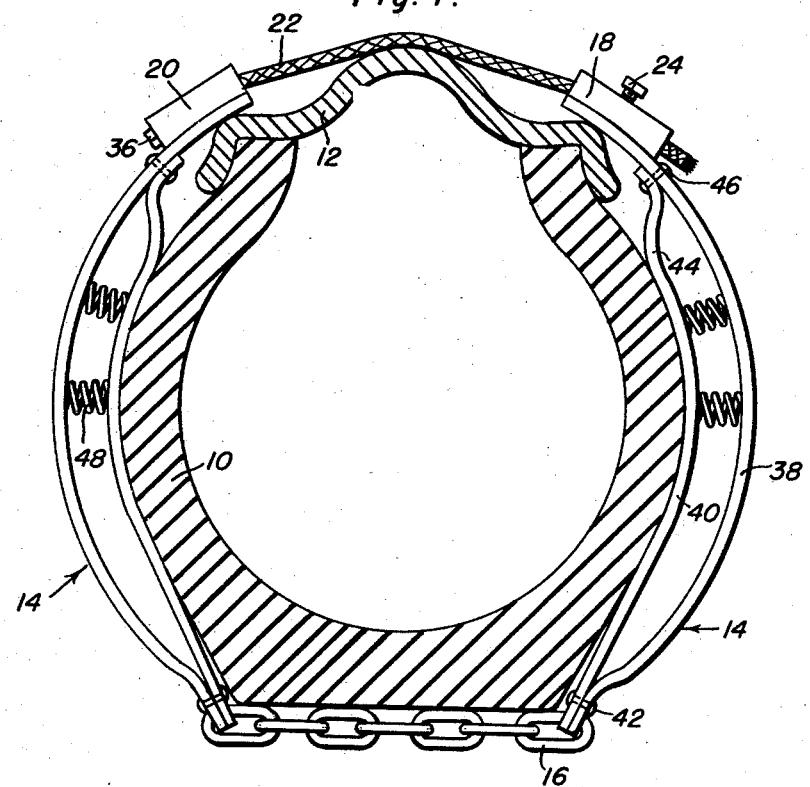
Figure 1 is a vertical transverse sectional view to a portion of a tire and the rim upon which the same is mounted showing the emergency tire chain applied thereto.

Referring now more specifically to the accompanying drawings, and particularly to Figures 1, 3–6 thereof showing the preferred embodiment of the invention, there is indicated at 10 a portion of a pneumatic automobile tire of any desired design, the inner tube thereof not being shown in the drawings.

The tire is shown as mounted upon a conventional type of wheel rim 12, and the emergency tire chain is shown applied thereto in Figures 1 and 3.

The emergency tire chain includes side members indicated generally at 14 which are connected with a non-skid tread member 16 which as shown in Figure 1 consists of a conventional type of cross chain to the end links of which are pivotally connected the side wall members 14.

As shown in Figure 1, the upper ends of the side wall members 14 have rigidly attached thereto in any suitable manner such as by riveting, bolting, welding or the like, a pair of fastening or connecting members which comprise preferably tubular sleeves 18 and 20. A flexible cable or similar member 22 is secured at one end to the sleeve 20, and has its other end detachably engaged in the sleeve 18 as by means of a manual clamping means 24, whereby the cable passes over the rim 12 and secures the emergency tire chain tightly in place, but resiliently secured, upon the tire casing 10.

As shown best in Figure 5, the sleeve 18 is preferably open ended at both ends, and the end of the cable fastening means 22 is loosely and slidably received therein, but is retained against unintentional withdrawal by means of a fastening screw 24 threaded through the mid portion of the sleeve 18, and clampingly engaging the cable 22 as shown in this figure.

As shown better in Figure 4, the sleeve 20 which is mounted upon the end of the other side wall member 14, consists of a cylinder open at one end, and having an aperture 26 in the other end for loosely receiving the end of the cable 22.

A coil spring 28 is mounted within the cylinder 20 and surrounds the cable 22, and is retained thereon as by a washer 30 and a nut 34 fastened on the screw threaded end of the cable 22. Obviously, by tightening the nut 34 any desired tension may be placed upon the coil spring 28 after the other end of the cable 22 has been secured to the sleeve 18; and alternatively, the effective length 22 may be varied by adjusting the nut 34 upon the screw threaded end thereof.

The open end of the cylindrical sleeve 20 is closed by a removable plug 36 for giving access to the interior thereof for the purpose of adjusting the nut 34 as desired.

Attention is now directed again to Figure 1 for a better understanding of the construction of the side members 14 of the emergency tire chain. As shown in this figure, a relatively rigid bowed outer member 38 preferably in the form of a steel strap or the like, is provided, and as above mentioned at its upper end is securely attached to the fastener sleeves 18 and 20. A relatively flexible inner member 40 in the form of a steel leaf spring or similar flexible member is riveted at its lower and upper ends respectively to the relatively rigid outer member 38, as at 42 and 46 respectively. This flexible inner member 40 is provided adjacent its upper end with a reversely curved portion 44 to provide sufficient material for permitting the inner member 40 to flex and bend as set forth hereinafter. At their lower ends, below the fastening rivets 42, the inner and outer members 40 and 38 are preferably perforated and are pivotally mounted upon the end or terminal links of the cross chain 16. In some instances, the construction as described will have sufficient resiliency in its inner member 40 compared to its relatively rigid outer member 38, to cause the same to frictionally grip and embrace the side walls of the tire casing 10, for securing the unit in proper position upon the casing. However, in some instances this gripping action will be found insufficient for extremely severe usage, and accordingly additional frictional increasing means 48 are provided. These means 48, as shown best in Figure 6, consist of a plurality of coil springs 48 positioned between the inner and outer members 40 and 38, and preferably rigidly secured thereto as by rivets 50. These springs impart an additional inward biasing action to the flexible member 40, for augmenting the resilient gripping engagement of this member upon the side walls of the tire casing 10, and for further insuring a non-slipping engagement of the side walls 14 upon the tire casing.

In applying the device, it is merely necessary to slightly open the upper end of the relatively rigid members 38, which as will be understood are inherently capable of a slight amount of flexing, whereupon the unit can be thrust upon the tire from the tread thereof. When so assembled, the natural inward bias of the inner member 40 will cause the same to tightly and frictionally grip the side walls of the tire. However, to insure that the device will stay in proper position upon a tire, and not be removed therefrom when the chains are employed in snow or mud or the like, the free end of the cable 22 is passed through the sleeve 18, and drawn tightly therein thus tensioning the spring 28 and applying a tension to the chain 16 as well as further augmenting the resilient frictional engagement of the inner member 40 upon the casing of the tire 10. The thumb screw 24 is then adjusted to impart the desired clamping action to the cable end 22, whereupon the device is rigidly attached to the tire for operation therewith.

Figure 2:
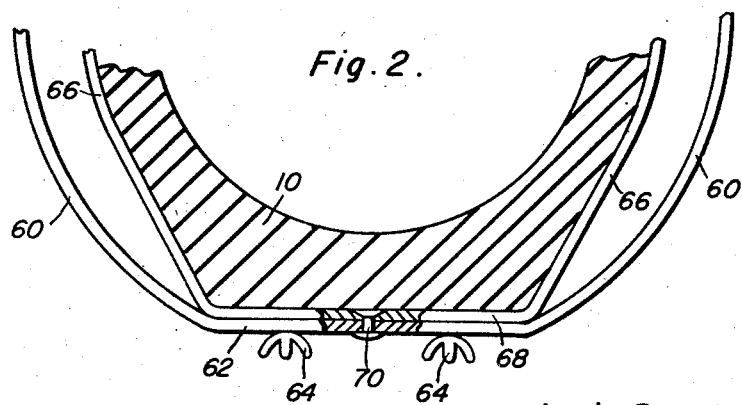
Figure 2 is a fragmentary view similar to Figure 1 but showing the lower portion of a modified form of construction of emergency chain and the tread or non-skid portion thereof.

Referring now to Figure 2, there is shown a similar construction in which the same cable and sleeve fastening means set forth in Figure 1 is employed. However, the relative rigid side wall members 60 are integrally connected at their lower ends by a tread member 62 which is provided with any suitable type of anti-skid element such as the spurs or knobs 64 carried thereby. The relatively flexible inner wall members 66, one at each side of the tire casing are united at their ends by integral cross members 68 attached to the tread member 62 as by a rivet or the like 70. The construction and operation of this form of the invention is identical with that set forth in the preceding embodiment, but this form possesses the advantage that the tread members are semi-rigid rather than flexible as compared with the chain 16, and that the side wall members of the device are integrally rather than pivotally connected thereto.

From the foregoing the principles of constructing and operating the invention will be readily understood and further explanation is believed to be unnecessary.

However, since numerous modifications and equivalents will readily occur to those skilled in the art after consideration of the foregoing specification and attached drawings, it is not intended to limit the invention to the exact construction shown and described, but all suitable modifications and equivalents may be resorted to falling within the scope of the appended claims.

Having described the invention, what is claimed as new is:

1. An emergency tire chain comprising a tire non-skid tread member, side members joined to each end of said tread member, fastening members secured to the upper ends of each of said side members, a cable connected to one of said fastening members and detachably secured to the other fastening member, said fastening members comprising sleeves, said cable having one end secured in one of said sleeves, a spring connected to said cable and to said sleeve in the interior thereof, the other end of said cable being slidably received in the other sleeve and a clamping means carried by said other sleeve for retaining said cable therein.

2. An emergency tire chain comprising a tire non-skid tread member, side members joined to each end of said tread member, fastening members secured to the upper ends of each of said side members, a cable connected to one of said fastening members and detachably secured to the other fastening member, each of said side members including a relatively rigid outer member and a relatively flexible inner member, said inner member being yieldingly urged inwardly of said outer member.

3. The combination of claim 2, wherein the ends of said inner member are secured to said outer member.

4. The combination of claim 3 wherein said inner member comprises a leaf spring.

5. The combination of claim 4 including spring means positioned between said inner and outer members.

6. The combination of claim 5 wherein said spring means comprise coil springs having their ends secured to said inner and outer members.

7. An emergency tire chain comprising a tire non-skid tread member, side members joined to each end of said tread member, fastening members secured to the upper ends of each of said side members, a cable connected to one of said fastening members and detachably secured to the other fastening member, each of said side members including a relatively rigid outer member and a relatively flexible inner member, said inner member being yieldingly urged inwardly of said outer member, said tread member being pivoted to said side members.

LOUIS PARASKEVAS.

REFERENCES CITED

The following references are of record in the file of this patent:

UNITED STATES PATENTS

| Number | Name | Date |
|---|---|---|
| 915,713 | Frey | Mar. 16, 1909 |
| 1,370,245 | Vander Slik | Mar. 1, 1921 |
| 1,516,823 | McNaughton | Nov. 25, 1924 |